W. B. CHAMBERLIN.
Bake-Pans.

No. 142,144.

Patented August 26, 1873.

Witnesses:

Inventor:
W. B. Chamberlin
Per
Attorneys.

UNITED STATES PATENT OFFICE.

WILLIAM B. CHAMBERLIN, OF WESTFIELD, NEW JERSEY.

IMPROVEMENT IN BAKE-PANS.

Specification forming part of Letters Patent No. 142,144, dated August 26, 1873; application filed May 5, 1873.

*To all whom it may concern:*

Be it known that I, WM. B. CHAMBERLIN, of Westfield, in the county of Union and State of New Jersey, have invented a new and Improved Baking and Roasting Apparatus; and I do hereby declare that the following is a full, clear, and exact description of the same, reference being had to the accompanying drawing forming a part of this specification.

The invention consists in applying a casing over the roasting or baking pan that commonly sits upon the top of a stove, in order that an escape of the heated air at top of case may take place, and thus prevent too great retention and intensity of heat just above the article which is being cooked.

Figure 1:
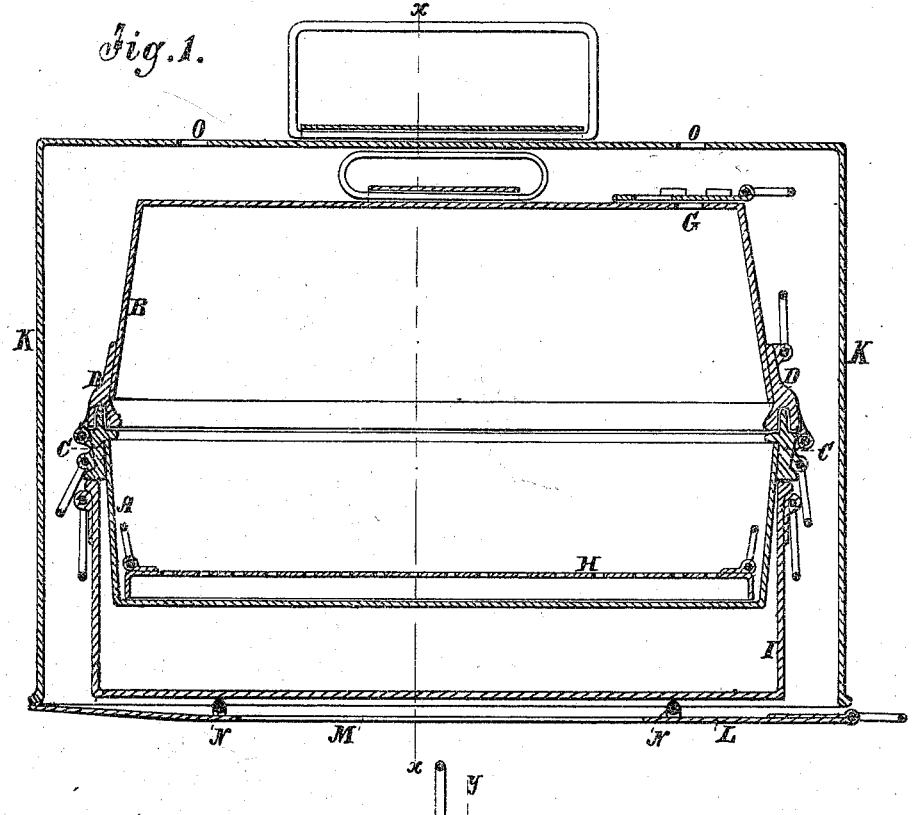
Figure 2:
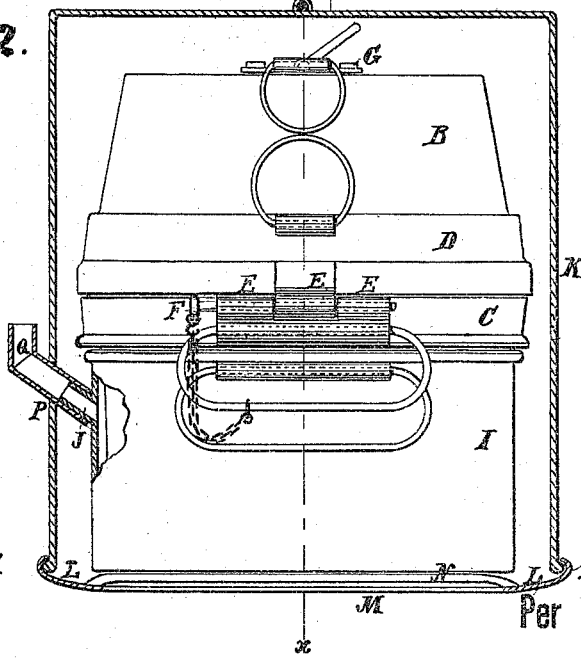

Figure 1 is a longitudinal, and Fig. 2 a transverse sectional, elevation.

A B represent two baking-pans, having tops C D, tongued, and grooved, respectively, so as to fit steam-tight upon one another, as shown in Fig. 1 of the drawing, provided with knuckles E on detachable pintles F, with ventilators G, false bottom H, and water-pan I, having an escape-pipe, J. K is the inclosing-case, slotted on the lower side at M, ribbed on the inside at N, and having the escape or draft holes O in the top.

The operation is as follows: As the air in the space formed by the ribs N, between chamber I and bottom L, becomes heated, it rises and passes around the pans, while the cooler air from above moves down next to said bottom L. As the circulation continues, the air in the top of case becomes hotter and hotter, having ultimately a tendency to overheat the pan B and to "overdo" the upper side of the article which is being cooked. By the use of the small apertures O, the hot air is caused to escape slowly and fresh air gradually indrawn, thus enabling the cook to maintain any desired degree of uniform temperature about the pans.

Having thus described my invention, what I claim as new, and desire to secure by Letters Patent, is—

The case K, slotted at M, ribbed at N, and apertured at O, in combination with a baking or roasting apparatus, as and for the purpose described.

WILLIAM B. CHAMBERLIN.

Witnesses:
MAHLON H. FERRIS,
J. L. HANSON.